United States Patent [19]

Sauvageau

[11] 3,719,995
[45] March 13, 1973

[54] APPARATUS FOR DRAFTING AN EXACT AXONOMETRIC PROJECTION DIRECTLY FROM A MULTIVIEW ORTHOGRAPHIC PROJECTION

[76] Inventor: Marc Sauvageau, 6428, rue Chabot, Montreal, Quebec, Canada

[22] Filed: July 13, 1970

[21] Appl. No.: 54,159

[52] U.S. Cl. .................................................. 33/77
[51] Int. Cl. ............................................. B43l 13/14
[58] Field of Search ............................... 33/77, 18 C

[56] References Cited

UNITED STATES PATENTS

| 3,337,962 | 8/1967 | McGuire et al. | 33/77 |
| 2,833,042 | 5/1958 | Groman | 33/77 |

FOREIGN PATENTS OR APPLICATIONS

| 816,322 | 7/1959 | Great Britain | 33/77 |

Primary Examiner—Harry N. Haroian
Attorney—Raymond A. Robic

[57] ABSTRACT

An apparatus mounted on a drafting board for drafting an exact axonometric projection of an object directly from a multiview orthographic projection of such object. The apparatus includes at least two reference devices placed on the drafting board each adapted to be positioned along a running line extending from corresponding points of at least two views placed in their normal orientation in orthographic projection of such object and oriented at a predetermined angle from a reference in the direction of sight, and a tracing device associated with each reference device and defining an axonometric line oriented at an angle from such reference depending upon the desired angles of the axonometric projection. The intersection the axonometric lines derived from said two views in orthographic projection defines one point of the axonometric projection. There is also provided a guide member also placed on the drafting board and positioned along a directrix line perpendicular to the bisectrix of the angle formed by each reference and tracing devices for guiding the reference and tracing devices whereby movement of each reference device to positions corresponding to other corresponding points of such object in the multiview orthographic projection will define the corresponding points in the axonometric projection at the intersection of the tracing devices. In an alternative embodiment, the reference and tracing devices could be the same device pivotably mounted on supporting arm to oscillate between a reference position corresponding to a running line to a tracing position corresponding to an exometric line. The supporting arm is perpendicular to the guide member.

10 Claims, 19 Drawing Figures

PATENTED MAR 13 1973 3,719,995

INVENTOR
Marc SAUVAGEAU

BY Raymond A. Robic

ATTORNEY

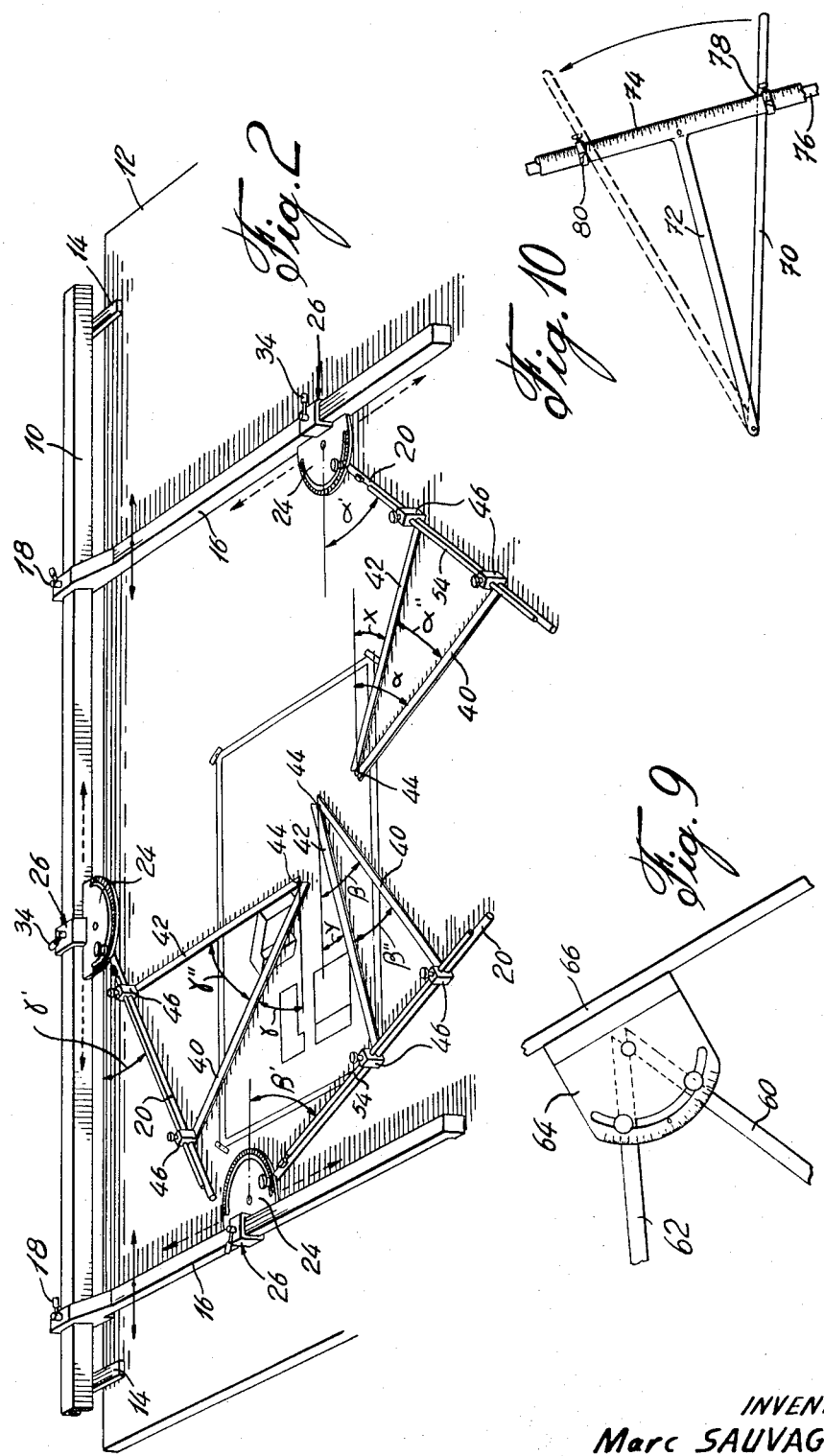

INVENTOR
Marc SAUVAGEAU

BY
Raymond A. Robic

ATTORNEY

INVENTOR
Marc SAUVAGEAU

BY Raymond A. Robic

ATTORNEY

INVENTOR
Marc SAUVAGEAU
BY
Raymond A. Robic
ATTORNEY

APPARATUS FOR DRAFTING AN EXACT AXONOMETRIC PROJECTION DIRECTLY FROM A MULTIVIEW ORTHOGRAPHIC PROJECTION

This invention relates to an apparatus mounted on a drafting board for drafting an exact axonometric projection directly from a multiview orthographic projection.

Many attempts have been made in the past for simplifying the problem of drafting axonometric projections from multiview orthographics projections. However, the multiview projections, in some apparatus, had to be oriented in a definite position to obtain an axonometric projection but the axonometric projection was limited to the isometric projection. Other apparatus were also developed but they were either complex, or gave an approximative projection.

In a book published in 1968 by the applicant and entitled "Projections axonometriques exactement des projections orthogonales" and in a paper presented at the Mid-Year Meeting of the Engineering Graphics Division of the American Society for Engineering Education, Jan. 21–24, 1970, there has been disclosed a novel method of obtaining an exact axonometric projection from a multiview orthographic projection. In accordance with the proposed method, an exact axonometric projection can be drawn directly at any angle and its elements reduced proportionally according to the angles used in the axonometric projection. However, the above method is graphical and time consuming.

It is therefore the object of the present invention to provide an apparatus for carrying out the above method in a manner which is fast and precise with a minimum amount of skill.

The apparatus, in accordance with the invention, includes at least two reference devices placed on a drafting board each adapted to be positioned along a running line extending from corresponding points of two views in their normal orientation in orthographic projection of such object and oriented at a predetermined angle from a reference in the direction of sight, and a tracing device associated with each reference device and defining an axonometric line oriented at an angle from such reference depending upon the desired angles of the axonometric projection. The intersection of the axonometric lines derived from said two views in orthographic projection defines one point of the axonometric projection. There is also provided a guide member also placed on the drafting board and positioned along a directrix line perpendicular to the bisectrix of the angle formed by each reference and tracing devices for guiding the reference and tracing devices, whereby movement of each reference device to positions corresponding to other corresponding points of such object in the multiview orthographic projection will define the corresponding points in the axonometric projection at the intersection of the tracing devices.

In an alternative embodiment of the invention, the reference and tracing devices are replaced by a single device pivotally mounted to oscillate between a reference position corresponding to a running line to a tracing position corresponding to an axonometric line. The single tracing blade is pivoted on a supporting arm which is movable along the guide member and perpendicular thereto.

In a preferred embodiment of the invention, the reference and tracing devices are pivotally interconnected at one end and pivotally attached to respective sliding members at their other end. The sliding members are slidably mounted on the guide member.

The apparatus may also comprise means for fixing the angular position of the tracing device with respect to the reference device. Such means may include a rod slidably mounted through the above-mentioned sliding members and means for locking the rod with respect to the sliding members. In addition, each guide member may be graduated to indicate directly the angle subtended by the reference and tracing devices.

A protractor may be associated with each guide member for indicating the angle of the guide member with respect to the above mentioned reference, and such protractor may include means for locking the guide member at such predetermined angle.

The invention will now be disclosed with reference to the following detailed description of a preferred embodiment thereof and to the accompanying drawings in which:

FIG. 2 illustrates the apparatus in accordance with the invention;

FIGS. 9 and 10 illustrate alternative embodiments of the invention.

Figure 1A:
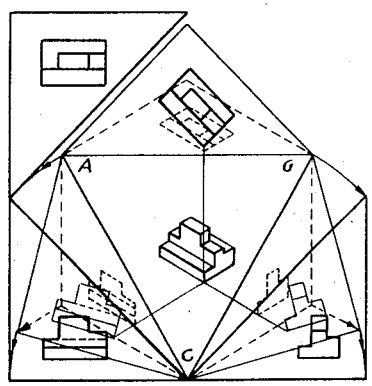
FIGS. 1a to 1e illustrate sketches for the purpose of illustrating the method upon which the present apparatus is based.

In order to more clearly understand the principle of operation of the apparatus, a few words will be said about the method upon which such apparatus is based. Referring to FIG. 1a, an object inclined in space and placed in a transparent cube may be projected on the faces of the cube. With each side of the central triangle ACG taken as a hinge, the faces of the tube can be brought in a vertical plane (plane of the sheet) so that three views are presented in true size, but in an inclined position. These inclined faces contained in the vertical plane may then be rotated about A and C to obtain a conventional multiview orthographic projection, that is, in the example shown, a front, top and right side view of the object.

Figure 1B:
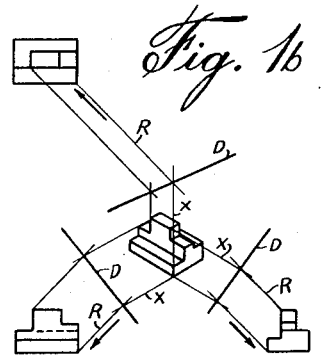

If we reverse the above steps, there can be obtained an axonometric projection directly from the multiview orthographic projection contained in the faces of the original cube as illustrated in FIG. 1b. Practically, the faces of the cube disappear and the displacement of the views is replaced by the three following construction lines:

1. axonometric lines X which correspond to the angles of the axonometric projection. These lines can be drawn at any angle depending on the need of presentation;

2. running lines R which are drawn from the multiview orthographic projection and oriented in the direction of sight of these views as illustrated by the arrows. The angle of the running lines may be derived graphically, calculated, or taken from tables as it will be explained later;

3. directrix lines D used to change the orientation of the running lines into the direction of the axonometric lines. The directrix lines are always perpendicular to the bisectrix of the angle formed by lines R and X. When the angles of the lines R and X are known, the angle D may be derived from the formula $D = 90° - (X+R)/2$.

and bottom views, depending on the direction of sight as illustrated by the arrows.

A few examples of such angles are illustrated in the following table by way of example. In the table, the angles of the axonometric lines A and B are designated by X and Y respectively while the angle of axonometric line C is always vertical as illustrated in FIG. 1e. The angles of the directrix lines D designated $\alpha'$, $\beta\alpha$, $\gamma'$ and $\omega'$ are also shown in the table, such angles being derived from the angles of the running and axonometric lines as mentioned previously. Finally, the table gives the values of the angles $\alpha''$, $\beta''$, $\gamma''$ and $\omega''$ which are equal to $(\alpha - X)$, $(\beta - Y)$, $(90° - \gamma)$ and $(90° - \omega)$ respectively for a reason which will become obvious later.

In practice, the angles given with precision in the table may be rounded off to the closer degree.

TABLE

| X | Y | α | β | γ | ω | α' | β' | γ' | ω' | α'' | β'' | γ'' | ω'' |
|---|---|---|---|---|---|----|----|----|----|----|----|----|----|
| 15 | 20 | 23°25' | 26°47' | 49°22' | 40°37' | 70°47' | 66°36' | 20°18' | 24°41' | 8°25' | 6°47' | 40°37' | 49°22' |
| 15 | 30 | 27°22' | 37°13' | 55°43' | 34°15' | 68°48' | 56°23' | 17° 8' | 27°52' | 12°22' | 7°13' | 34°16' | 55°44' |
| 15 | 40 | 31°44' | 47°35' | 60°31' | 29°28' | 66°37' | 46°12' | 14°44' | 30°15° | 16°44' | 7°35' | 29°28' | 60°31' |
| 15 | 45 | 34°15' | 52°46' | 62°37' | 27°22' | 65°22' | 41°6' | 13°41' | 31°18' | 19°15' | 7°46' | 27°22' | 62°37' |
| 20 | 20 | 28°55' | 28°55' | 44°59' | 44°59' | 65°32' | 65°32' | 22°30' | 22°30' | 8°55' | 8°55' | 45°0' | 45°0' |
| 20 | 30 | 33°22' | 39°46' | 51°32' | 38°26' | 63°18' | 55°9' | 19°13' | 25°46' | 13°22' | 9°40' | 38°27' | 51°33' |
| 20 | 40 | 38°26' | 50°19' | 56°37' | 33°22' | 60°46' | 44°50' | 16°41' | 28°18' | 18°26' | 10°19' | 33°22' | 56°37' |
| 20 | 45 | 41°27' | 55°46' | 58°53' | 31°6' | 59°16' | 39°39' | 15°33' | 29°26' | 21°27' | 10°40' | 31°6' | 58°53' |
| 25 | 20 | 34°19' | 31°6' | 41°27' | 48°32' | 60°26' | 64°26' | 24°16' | 20°43' | 9°19' | 11°6' | 48°32' | 41°27' |
| 25 | 30 | 39°12' | 42°14' | 48°3' | 41°56' | 57°53' | 53°52' | 20°58' | 24°1' | 14°12' | 12°14' | 41°56' | 48°3' |
| 25 | 40 | 44°59' | 53°17' | 53°17' | 36°42' | 55°0' | 43°21' | 18°21' | 26°38' | 19°59' | 13°17' | 36°42' | 53°17' |
| 25 | 45 | 48°32' | 58°53' | 55°40' | 34°19' | 53°13' | 38°3' | 17°9' | 27°50' | 23°32' | 13°53' | 34°19' | 55°40' |
| 30 | 20 | 39°40' | 33°22' | 38°26' | 51°32' | 55°9' | 63°18' | 25°46' | 19°13' | 9°40' | 13°22' | 51°33' | 38°27' |
| 30 | 30 | 44°59' | 44°59' | 44°59' | 44°59' | 52°30' | 52°30' | 22°30' | 22°30' | 14°59' | 14°59' | 45°0' | 45°0' |

© 1970 Marc Sauvageau.

Figure 1C:
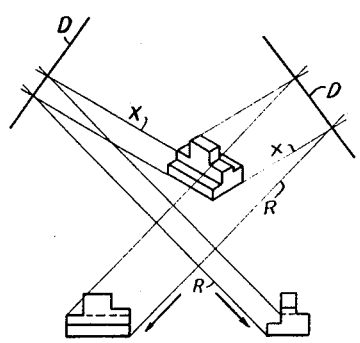

Depending on the distance between the views in the multiview orthographic projection and the location where the axonometric projection is to be drawn, the presentation of the construction lines can be slightly different as illustrated in FIG. 1c. However, the same result is obtained : the running lines R reach the directrix lines D and are oriented in the direction of the axonometric lines X.

Figure 1D:
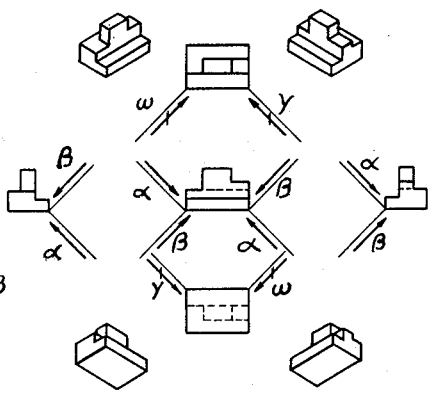
Figure 1E:
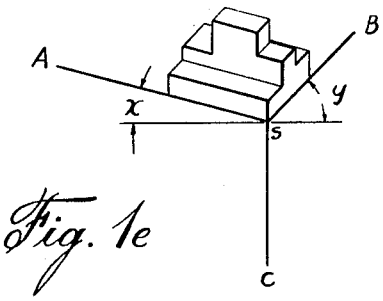

It is to be also noted that only two views are required for drafting an axonometric projection. The choice of such views determines the observation permissible in an axonometric projection as illustrated in FIG. 1d. The front view can be used with any other view to obtain an axonometric projection showing the front of the object. Used with a front view, a right side view will definitely show an object by its right side either from above or below, while the use of a top view permits the construction of an axonometric projection showing the right or left side of the object seen from the front. The same is true for a left side view or a bottom view.

The key of the method is to determine the angle of the running lines R. Such angle may be determined graphically or calculated for any axonometric projection and tabulated for future reference. The method of figuring out the angles of the running lines will not be disclosed here since it does not form part of the present invention which is directed to an apparatus for producing axonometric projections once all the values of the angles of the running lines are known and tabulated.

The respective angle of the running lines will hereinafter be designaged $\alpha$, $\beta$, $\gamma$ and $\omega$, depending on the direction of the running lines as indicated by the arrows in FIG. 1d. The angles $\alpha$ and $\beta$ are used with front and side views while the angle $\gamma$ and $\omega$ used with top It is believed that the above description of the method for tracing axonometric projection from multiview orthographic projection will be sufficient to illustrate the principle behind the apparatus in accordance with the invention. For a full description of the method, reference is made to the above identified publications.

Referring to FIG. 2, there is shown a track type drafting apparatus including a longitudinal guide beam 10 adapted to be secured to a conventional drafting board 12 by means of clamps 14. Two vertical guide beams 16 are slidably mounted on horizontal guide beam 10 and adapted to be locked in position by locking devices 18. A guide member 20 is slidably mounted on the horizontal guide beam 10 and on each of the vertical guide beams 16.

Figure 3:
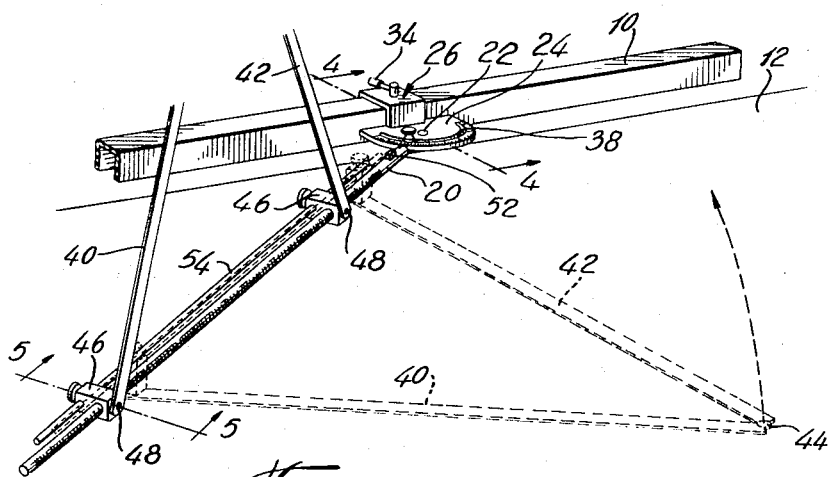
FIG. 3 illustrates one guide member of the apparatus and its associated reference and tracing devices.
Figure 4:
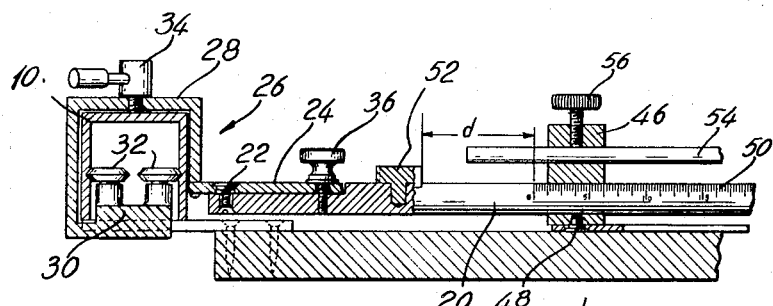
FIG. 4 illustrates a section view taken along lines 4—4 of FIG. 3.

Referring to FIGS. 3 and 4, guide member 20 is pivotally connected at pivot point 22 to a protractor 24 which is secured to a carriage 26. Carriage 26 has a portion 28 partially encircling beams 10 or 16 and a portion 30 projecting into beams 10 or 16 which, in the example shown, are of U-type construction. Portion 30 includes four rollers 32 (only two shown) forming a four corner assembly. The rollers move in suitable grooves formed in the inside wall of U-shaped beams 10 and 16 and maintain the carriage 26 in position while permitting feather-touch movement thereof. The carriage 26 may be locked in position by locking device 34. Of course, other types of carriage constructions are also envisaged.

Guide member 20 is provided with a locking means in the form of a thumb screw 36 which rides in a slot 38 in protractor 24. Of course, other locking means could be used. The locking means permits to fix the angle of the guide member 20 with respect to a reference which, in the embodiment and tables disclosed, is the horizontal. The protractor angles are angles $\alpha'$, $\beta'$, $\gamma'$ and $\omega'$ mentioned above. It is to be understood that other means for locating and securing guide member 20 at a definite angle on the drafting board 12 are also envisaged.

Figure 5:
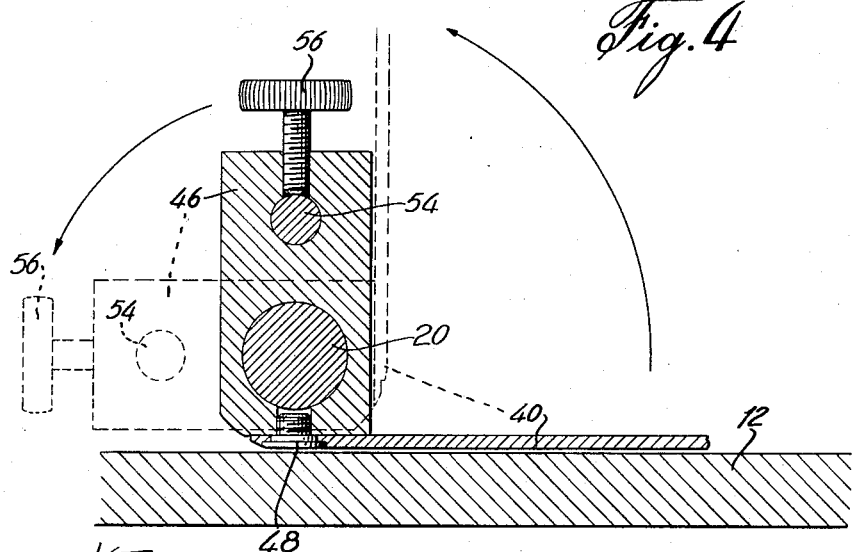
FIG. 5 illustrates a section view taken along lines 5—5 of FIG. 3.

Two arms, hereinafter also identified as reference device 40 and tracing device 42 are pivotally connected at one end thereof at pivot point 44 and pivotally attached at their other respective end to a sliding member 46 at point 48. It is to be noted that the guide member 20 in the embodiment of FIG. 2, is circular so as to permit to lift arms 40 and 42 off the drawing board when required as illustrated in FIGS. 3 and 5. However, other arrangements permitting lifting of the arms 40 and 42 could be provided.

Reference device 40 is used to set up the angular position of the running lines with respect to a reference which, in the present embodiment, is the horizontal, while tracing device 42 sets up the axonometric lines. In the embodiment disclosed, arms 40 and 42 are of equal length and, therefore, the bisectrix of the angle between the two arms is necessarily perpendicular to guide member 20. However, it is to be understood that other arm arrangements having the bisectrix of the angle therebetween perpendicular to guide member 20 are also envisaged.

Guide member 20 is further provided with graduations such as illustrated at 50 in FIG. 4 of the drawings for setting the angle between the arms 40 and 42 as it will be explained in a later part of the description. A stop 52 is provided for determining the zero position of such angle. The zero setting of the graduation 50 is located at a distance $d$ equal to the width of two sliding members 46 (arms 40 and 42 closed) and the angle is measured on the outside surface of the sliding member associated with arm 40.

In order to lock the position of the arms 40 and 42 with respect to each other, a rod 54 protrudes through sliding members 46 and a locking means such as thumb screw 56 is threaded into each sliding member 46 and is adapted to contact rod 54. It is to be understood that the graduations 50 could be located on the rod 54 instead of on guide member 20. In such a case, stop means for determining the zero setting of the angle will have to be provided in a manner similar to stop 52 of guide member 20.

Figure 6:
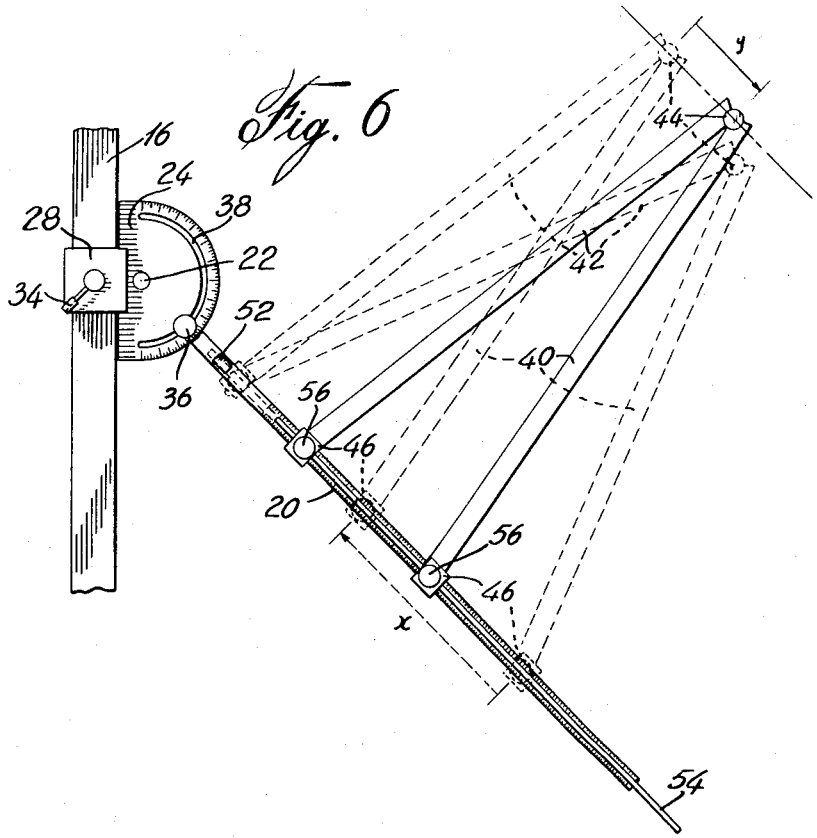
FIG. 6 illustrates the manner in which the reference and tracing devices are slidably moved on the guide member as well as the angular adjustment of such devices.

The setting of the angle of the arms is illustrated in FIG. 6. The sliding member 46 associated with arm 42 is first moved against stop 52 and locked in position by the thumb screw 56 associated with arm 42. The sliding member 46 associated with arm 40 is subsequently moved a distance shown as $x$ to set a desired angle between arms 40 and 42. Once this angle is set, the arm 40 is locked in position by thumb screw 56 associated therewith and the two arms 40 and 42 are thereby locked in relative position with respect to each other. It is to be understood, however, that the pair of arms are still slidably movable on guide member 20 and may be moved together as indicated by arrow $y$ for a reason which will be disclosed later.

The angle between arms 40 and 42 which corresponds to angles $\alpha''$, $\beta''$, $\gamma''$ and $\omega''$ in the tables, corresponds to the difference between the angles of the running lines and the axonometric lines as illustrated in FIG. 2.

The operation of the above disclosed apparatus for drafting an axonometric projection from a multiview orthographic projection will now be disclosed with reference to FIGS. 7a to 7f of the drawings. If it is desired to draw an axonometric projection of an object as seen from the right and from the top, a top and front view projections may be used. The angles between arms 40 and 42 will be $\beta''$ and $\gamma''$ as indicated by the direction of the arrows in FIG. 1d and in the table. If the angles X and Y of the desired axonometric projection are 20° and 40° respectively, the values of the angles $\beta''$ and $\gamma''$ are read in the tables as being 10°19' and 33°22' respectively. Such values are reproduced on graduations 50 associated with the corresponding set of arms 40 and 42 and arms 40 and 42 are locked in position with respect to each other by tightening thumb screws 56 on rod 54. Similarly, the angles $\beta'$ and $\gamma'$ as taken from the table are respectively 44°50' and 16°41' and such angles are reproduced on the protractors 24 of the associated guide members and the guide members are locked in position by tightening thumb screws 36. Of course, the above angles could be reproduced by a protractor not associated with the apparatus.

Once the arms 40 and 42 and guide members 20 are locked in position, they remain locked for the whole drafting of the axonometric projection. The guide beams 16 are also locked in position with respect to guide beam 10 and carriages 26 with respect to guide beams 10 and 16. Thus arms 40 and 42 only and their attachments to the guide members 20 are permitted to move along the guide members during drafting of the whole axonometric projection.

Figure 7A:
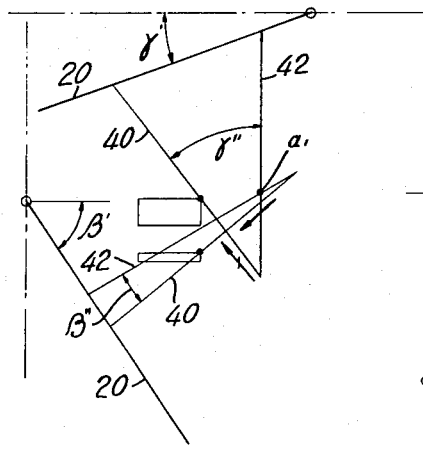
FIGS. 7a to 7f illustrate the operation of the apparatus in accordance with the invention.
Figure 7B:
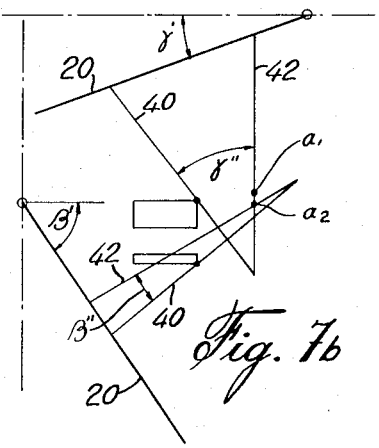
Figure 7C:
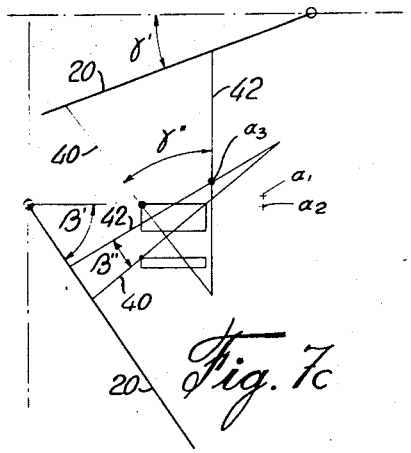
Figure 7D:
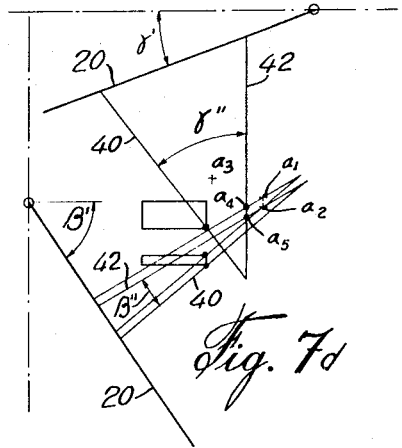
Figure 7E:
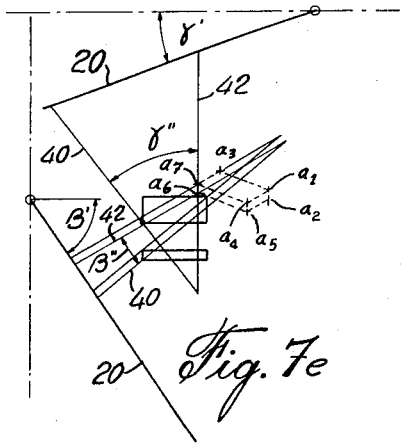
Figure 7F:
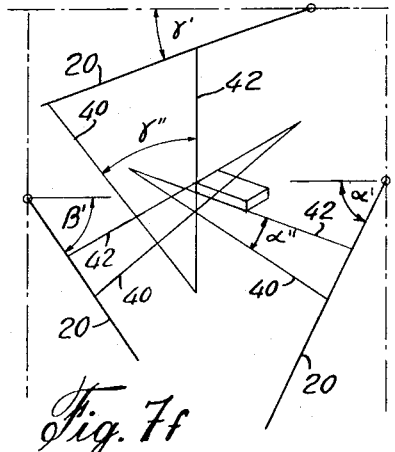

Once the above angles are set, the reference devices or arms 40 are parallel to running lines and the tracing devices or arms 42 parallel to the desired axonometric lines of the object which is intended to be drawn in axonometric projection. Consequently, when two reference devices are positioned along two running lines extending from corresponding points of two views in orthographic projection the intersection of the tracing devices determines a first point $a_1$ of the axonometric projection. The arms 40 are subsequently moved along the guide members 20 so as to be positioned adjacent to two other corresponding points of the multiview orthographic projection as illustrated consecutively in FIGS. 7b to 7e to define the corresponding points $a_2$ to $a_7$ of the axonometric projection at the intersection of the tracing devices 42. The above-mentioned points $a_1$ to $a_7$ may then be joined using a straight edge or the third set of arms as illustrated in FIG. 7f. Of course, when the third set of arms is used for completing the axonometric projection, the angle of its guide member and of its associated arms must be properly adjusted. In the above example, the angles $\alpha'$ and $\alpha''$ must therefore be reproduced.

It will be noted that arms 40 and 42 are in fact thin blades and that they may be easily overlapped to locate the above mentioned points $a_1$ to $a_7$. Of course, as mentioned previously in connection with the description of FIG. 5, each set of arms 40 and 42 may be pivoted around guide member 20 to facilitate positioning of arms 40 at corresponding points in at least two orthographic views and prevent interference between two sets of arms.

The above operation of the device may lead to the conclusion that the apparatus is designed for locating the points of the axonometric projection only, such points being later joined to complete the projection. However, it is to be understood that the position of each of the three tracing blades, when used, corresponds to the axonometric lines and that such lines may be traced directly. Of course, only portions of such lines would be required for completing the desired axonometric projection but the lines may be first drawn lightly in pencil and the unwanted portions of the lines erased when the drawing is finalized.

Referring back to FIG. 1d, it will be realized that the same axonometric projection could be made by using a top and a right side view. In such a case, however, the right hand guide member and associated arms would be used instead of the left hand guide member. Similarly, the same axonometric projection could be obtained using a front and a right side view. In this case, the left and right hand guide members and associated arms would be used.

Figure 8:
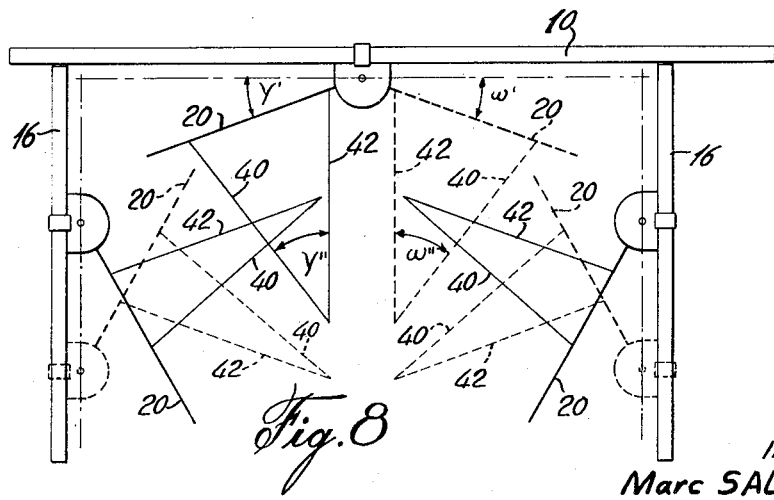
FIG. 8 illustrates the various positions of the guide members and associated blades of the apparatus in accordance with the invention.

Now, if an axonometric view showing the left side of an object from above is needed, using a top and front view, the top guide member must be rotated to the position illustrated in dashed lines in FIG. 8 and the arms 40 and 42 withdrawn from the guide member and reinserted in the proper position with the arm 42 closer to protractor 24. The top guide member so positioned will be used with the right hand guide member and associated arms. If a top and a left side view is used, the left hand guide member is used instead of the right hand guide member. Finally, the same axonometric projection may be traced from a left side view and a front view using the left and right hand guide members.

For tracing an axonometric view of an object from below, the same sets of arms may be used following the same procedure as described above while taking into consideration the directions of sight of the views used as illustrated in FIG. 1d.

When an axonometric view showing the right side of an object from below is needed and that the right and left hand guide members are used, such guide members may be rotated as illustrated in dashed lines in FIG. 8 and the corresponding arms withdrawn from the guide members and reinserted into the proper position wherein arms 42 are closer to protractor 24 as mentioned above. It is to be understood that the guide members and corresponding arms could be used in their original position but it may be advantageous to rotate the arms to prevent unnecessary crossing of the arms as it will be obvious from the examination of FIG. 1d of the drawings.

In the above description, all the angles are measured from the horizontal. However, it may be easily understood that the vertical may also be taken as a reference. In such a case, the angles of the table will have to be modified accordingly.

It is also to be understood that the arrangement of the reference and tracing devices with respect to the guide members may vary from the one illustrated. The only restriction is that, in any alternative arrangement, the bisectrix of the angle between the reference and tracing devices be perpendicular to the guide member and that the reference and tracing devices be movable with respect to the guide member while maintaining the above bisectrix perpendicular to the guide member.

Referring to FIG. 9, for example, the reference and tracing arms 60 and 62 are pivoted on a supporting member 64 which is independent of guide 66 and may be moved therealong. Supporting member 64 carries a protractor for measuring the angle between the arms 60 and 62. It is to be understood that the arms must always be positioned in such a way that the bisectrix of the angle between the arms 60 and 62 be perpendicular to the surface of the supporting member adapted to contact the guide member 66.

Referring to FIG. 10, there is shown another alternative arrangement of the apparatus in accordance with the invention wherein a single arm 70 may be used both as a reference device and as a tracing device. Arm 70 is pivoted on the leg 72 of a T-shaped member 74 slidably mounted with respect to the guide member 76. The angle between the two positions corresponding to the previously used reference and tracing arms are adjusted by means of sliding members 78 and 80. Once the sliding members 78 and 80 are set in position, the arm 70 may be moved from a reference position corresponding to the running lines extending from each corresponding points of the multiview orthographic projection to a tracing position corresponding to the axonometric lines of the axonometric projection.

The reference and tracing arms 60 and 62 of FIG. 9, could be replaced by a single arm pivotally mounted on supporting member 64 and sliding in the slot of the supporting member to oscillate between two stoppers, and operate similarly as described in FIG. 10.

In the above description, the apparatus is closed on the third angle system of projection (American system) but the apparatus can also be used with the first angle system of projection (European system) to obtain the same results following the same directions of sight of the views.

I claim:

1. An apparatus adapted to be mounted on a drafting board for drafting an exact axonometric projection of an object directly from a multiview orthographic projection of said object comprising:

a. at least two reference devices placed on the drafting board and each adapted to be positioned along a running line extending from corresponding points of at least two views in their normal orientation in orthographic projection of said object and oriented at a predetermined angle from a reference in the direction of sight;

b. a tracing device connected to each reference device and defining an axonometric line oriented at an angle from said reference depending upon the desired angles of the axonometric projection, the intersection of the axonometric lines derived from said two views in orthographic projection defining one point of said axonometric projection;

c. a guide means for sliably guiding each combination of reference and tracing devices, said guide means being also placed on the drafting board and positioned along a directrix line perpendicular to the bisectrix of the angle formed by each reference and tracing device, whereby movement of each reference device to positions corresponding to other corresponding points of such object in the multiview orthographic projection will define the corresponding points in the axonometric projection at the intersection of the tracing devices; and d. means adapted to be mounted on the drafting board for locating and securing the guide means at a definite angle from said reference.

2. An apparatus as defined in claim 1, wherein said reference and tracing devices are pivotally interconnected at one end, and further comprising a sliding member pivotally attached to the other end of said reference and tracing device and slidably mounted on said guide member.

3. An apparatus as defined in claim 2, wherein the cross-section of said guide member is circular thereby permitting rotation of said sliding members around said guide members and pivotal of such reference and tracing devices.

4. An apparatus as defined in claim 2, further comprising means for fixing the angular position of said tracing device with respect to said reference device.

5. An apparatus as defined in claim 4, wherein said means for fixing the angular position of said tracing device with respect to said reference device includes a rod slidably mounted through said sliding members and means for locking said rod with respect to said sliding members.

6. An apparatus as defined in claim 1, wherein the angles of the running lines and of the directrix lines may be determined graphically, calculated or read directly from tables, and depend upon the angles of said axonometric projection and the direction of sight of said object.

7. An apparatus as defined in claim 1, wherein said guide member is graduated for indicating the angle subtended by said reference and tracing devices.

8. An apparatus as defined in claim 7, wherein the angle subtended by said reference and tracing devices corresponds to the subtraction of the angles of the running lines from the angles of the axonometric lines.

9. An apparatus adapted to be mounted on a drafting board for drafting an exact axonometric projection of an object directly from a multiview orthographic projection of said object comprising:

a. at least two T shaped members placed on the drafting board;
b. a gracing device pivoted at the end of the leg of each T shaped member and adapted to be moved from a reference position coinciding with each running line extending from corresponding points of at least two views in their normal orientation in orthographic projection to a tracing position corresponding to an axonometric line oriented at an angle from said reference depending upon the desired angles of the axonometric projection, the intersection of the axonometric lines corresponding to the positions taken by the tracing devices defining one point of said axonometric projection;
c. a guide member for guiding each T shaped member, said guide member being also placed on the drafting board and positioned along a directrix line perpendicular to the bisectrix of the angle formed by the tracing device during its angular displacement from said reference to said tracing positions, whereby movement of each T-shaped member will permit the positioning of the tracing devices to reference positions corresponding to other corresponding points of said object in the multiview orthographic projection in order to define, when the tracing devices are moved to their tracing positions, the corresponding points in the axonometric projection at the intersection of the axonometric lines defined by the tracing devices, and
d. means adapted to be mounted on the drafting board for locating and securing the guide members at a definite angle from said reference.

10. An apparatus as defined in claim 1, wherein said means for locating and securing said guide means at a definite angle includes a guide beam for each guide means, a carriage slidably mounted on each guide beam, a protractor secured to each carriage and graduated from said reference, and means associated with said protractor for locking said guide means at said definite angle.

* * * * *